United States Patent
Welp

(10) Patent No.: US 6,555,082 B1
(45) Date of Patent: Apr. 29, 2003

(54) METHOD FOR WET FLUE GAS DESULFURIZATION AND DEVICE FOR IMPLEMENTING SAID METHOD

(75) Inventor: Helmut Welp, Ochsenfurt (DE)

(73) Assignee: Babcock Borsig Power Environment GmbH (DE)

( * ) Notice: Subject to any disclaimer, the term of this patent is extended or adjusted under 35 U.S.C. 154(b) by 0 days.

(21) Appl. No.: 09/700,834

(22) PCT Filed: May 14, 1998

(86) PCT No.: PCT/EP99/03320

§ 371 (c)(1),
(2), (4) Date: Nov. 16, 2000

(87) PCT Pub. No.: WO99/59703

PCT Pub. Date: Nov. 25, 1999

(30) Foreign Application Priority Data

May 16, 1998 (DE) .................................. 198 22 073

(51) Int. Cl.[7] .................. B01D 53/48; B01D 53/50; B01D 53/78
(52) U.S. Cl. ................... 423/243.08; 423/243.09; 423/555; 422/168; 422/169; 422/170; 422/188; 422/189; 422/194; 422/234
(58) Field of Search .............. 423/243.08, 243.09, 423/555; 422/168, 169, 170, 188, 189, 194, 234

(56) References Cited

U.S. PATENT DOCUMENTS 5,034,028 A 7/1991 Ukawa et al. ................ 55/73
5,630,991 A * 5/1997 Gal et al. ............... 423/243.01
5,665,317 A 9/1997 Laslo ......................... 422/171

FOREIGN PATENT DOCUMENTS

| DE | 43 45 364 C2 | 3/1995 |
| DE | 43 38 379 A1 | 5/1995 |
| DE | 197 41 120 A1 | 12/1998 |
| EP | 0 162 536 A1 | 11/1985 |
| EP | 0 363 009 A1 | 4/1990 |
| EP | 0 745 421 A1 | 12/1996 |

OTHER PUBLICATIONS

International Search Report for PCT/EP99/03320.

* cited by examiner

Primary Examiner—Stanley S. Silverman
Assistant Examiner—Timothy C Vanoy
(74) Attorney, Agent, or Firm—R W Becker & Associates; R W Becker

(57) ABSTRACT

A method and apparatus for wet flue gas desulfurization in a two-circuit washer having two washers for an absorption agent based on suspensions containing calcium compounds, a sump for supplying the absorption agent to the first washer, and a container for at least partial recovery of the absorption agent from the second washer. The absorption agent, while being returned to the container, is actively brought into contact with oxygen to oxidize calcium sulfite to calcium sulfate. The return line has apparatus for actively blowing in oxygen with only a relatively slight overpressure necessary to blow the air into the absorption agent. The absorption agent to be oxidized is already moving because the difference in elevation along the return line from the recovery apparatus to the container, whereby the absorption agent then arrives more or less completely oxidized.

7 Claims, No Drawings

METHOD FOR WET FLUE GAS DESULFURIZATION AND DEVICE FOR IMPLEMENTING SAID METHOD

BACKGROUND OF THE INVENTION

The subject of the present invention is a method for wet flue gas desulfurization in a two-circuit washer having spray apparatus for the absorption agent and a container for the absorption agent, which is based on suspensions containing calcium compounds, whereby the calcium sulfite initially obtained is oxidized by oxygen in the air or by residual oxygen of the flue gas to calcium sulfate, and whereby after the second wash process the absorption agent is at least partially recovered and returned to the container. The present invention furthermore relates to an apparatus for performing this method.

Known from DE 29 44 536 and DE 30 11 592 is a method in which at least part of the used absorption agent of the second (top) cycle is recovered and returned to the absorber reservoir via a recovery and return device and in which the reservoir is arranged adjacent to the washer. In the method and apparatus for performing this method it has been common practice to arrange the container for the absorption agent adjacent to the washer and to supply the spray apparatus from this container.

Known from DE 43 45 364 is returning the used absorption agent of the second (top) cycle in such a two-circuit washer to the container and continuing the reaction between sulfur oxide compounds and calcium compounds there.

Known from DE A 196 01 193 is a method in which the absorption agent is retained in the interior of the washer in a container that is open at its top and the absorption agent is recovered at least in part therein after the washing process, whereby the fluid level in the container is higher than the fluid level in the sump of the washer. All of these methods and apparatus have proven themselves in principle. However, in all of these methods oxidizing the calcium sulfite to calcium sulfate requires additional costs and consumes additional energy.

The object of the invention is therefore to simplify and render less expensive in a two-circuit washer the oxidation of the calcium sulfite to calcium sulfate, whereby naturally the operational safety must not be jeopardized.

SUMMARY OF THE INVENTION

This object is achieved in that after the second wash process the recovered part of the absorption agent is actively brought into direct contact with oxygen in the air.

In conventional two-circuit washers, after the second wash process the absorption agent is at least partially recovered using a funnel or recovery basin from which the absorption agent flows back or is pumped back via a return line into the container for the absorption agent. In apparatus in accordance with DE A 196 01 193, after the wash process the absorption agent is at least partially recovered by the container that is open at the top and that is located in the interior of the washer.

The oxidation of calcium sulfite to calcium sulfate depends largely on the pH of the absorption agent. The lower the pH, the more rapidly and more easily the calcium sulfite oxidizes to calcium sulfate.

The method in accordance with the invention makes use of the fact that after the second wash process not only does the absorption agent contain more calcium sulfite, but it also has a lower pH. While the pH of the absorption agent in general is greater than 6, and may even be greater than 6.5, after the second wash process the pH of the absorption agent is approx. 5.5 to 5.6. In all previous conventional two-circuit washers, however, this part of the absorption agent is oxygen-poor so that only slight oxidation occurs. In conventional two-circuit washers, and also in washers in accordance with DE A 196 01 193, the absorption agent is collected in particular in the sump after the first wash process and is actively brought into contact there with oxygen in the air.

The invention permits calcium sulfite to be oxidized to calcium sulfate in a manner that is substantially more simple and less expensive in that after the second wash process the absorption agent is at least partially recovered and returned to the container, but while on this path is actively brought into contact with oxygen in the air. In terms of mechanics, this is most simple to accomplish when the recovery apparatus and/or the return line has apparatus for actively blowing in oxygen in the air. Only a relatively slight overpressure is necessary in order to blow the air into the absorption agent. The absorption agent to be oxidized is already moving because the difference in elevation in the discharge line is now causing the absorption agent to be conducted from the recovery apparatus to the container, where it then arrives more or less completely oxidized.

In an apparatus in accordance with DE A 196 01 193, it is sufficient to actively aerate the quantity of the absorption agent that has been recovered just below the upper fluid level of the absorption agent. This ensures that the oxygen enrichment is sufficient for the calcium sulfite to oxidize more or less completely to calcium sulfate as it travels slowly to the bottom of the container. Any necessary residual oxidation can be obtained by blowing oxygen in the air into the sump in the conventional manner.

Therefore, in the method in accordance with the invention and using the apparatus in accordance with the invention, if the calcium sulfite is not to completely oxidize to calcium sulfate, the complexity previously associated with oxidizing calcium sulfite to calcium sulfate diminishes substantially, whether by blowing oxygen in the air into the sump or into a separate oxidation container. What is important in either case is that after the wash process the absorption agent has optimum concentrations of calcium sulfite and an optimum pH for oxidation and therefore can be converted by direct active contact with oxygen in the air.

A substantial advantage of the method in accordance with the invention is that, once its oxygen content has been largely consumed, the air blown in for the oxidation is removed from the desulfurization system with the flow of the flue gas. No removal lines are required for the used air, which involves more complex capital outlay, in particular for apparatus having a separate oxidation vessel.

Naturally in principle it is possible to accelerate and render more efficient the oxidation of the calcium sulfite to calcium sulfate in that the air used therefor is enriched with oxygen. In principle it would also be possible to use pure oxygen rather than oxygen in the air. However, in such embodiments of the method the expense associated with obtaining pure oxygen would be substantial. There are flue gas desulfurization systems, however, in which oxygen-enriched air is available and can therefore be used in a simple and cost effective manner for oxidizing calcium sulfite to calcium sulfate in accordance with the invention.

Of particular importance in terms of mechanical complexity and operational costs, however, is that in the method in accordance with the invention it is possible to exploit the high turbulence of the absorption agent in the recovery funnel and the high relative speed in a return line. Thus none of the previously used strong additional fans or pipelines are required.

With a recovery funnel for the absorption agent it is possible, for example, to dispose around the outlet a pipe that has a series of orifices or nozzles through which the air can be blown into the flowing absorption agent without great overpressure. Also, when there is active contact of the absorption agent with oxygen in the air in the return line, relatively simple aeration apparatus are suitable in which the air can be blown into the flow of liquid with relatively low overpressure.

The specification incorporates by reference the disclosure of German priority document DE 198 22 073.1 filed May 16, 1998 and European Patent Application priority document PCT/EP99/03320 filed May 14, 1999.

The present invention is, of course, in no way restricted to the specific disclosure of the specification and drawings, but also encompasses any modifications within the scope of the appended claims.

What is claimed is:

1. A method for wet flue gas desulfurization of a flue gas by contacting the flue gas with an absorption agent having calcium compounds, the method comprising:

passing the flue gas through a first washer having a spray device for applying absorption agent supplied from a sump to the flue gas, the sump being supplied with oxygen for effecting the oxidation of calcium sulfite in the absorption agent to calcium sulfate thereat;

thereafter passing the flue gas through a second washer having a spray device for applying absorption agent to the flue gas such that the flue gas is subjected to serial applications of absorption agent due to its passage through the first washer and the second washer;

a container for the absorption agent;

at least partially recovering used absorption agent from the second washer in a recovery device;

discharging absorption agent from the recovery device along a return line to the container; and supplying oxygen into the return line to contact absorption agent thereat such that calcium sulfite in the absorption agent is oxidized to calcium sulfate.

2. A method according to claim 1, wherein the oxygen is supplied into the return line by an apparatus for actively blowing in air.

3. A wet flue gas desulfurization apparatus for effecting the desulfurization of a flue gas by contacting the flue gas with an absorption agent having calcium compounds, the apparatus comprising:

first washer having a spray device for applying absorption agent to flue gas;

a sump for supplying absorption agent to the first washer;

a device for supplying oxygen to the sump for effecting the oxidation of calcium sulfite in the absorption agent to calcium sulfate thereat;

a second washer having a spray device for applying absorption agent to flue gas which has already passed through the first washer such that the flue gas is subjected to serial applications of absorption agent due to its passage through the first washer and the second washer;

a recovery device for at least partially recovering used absorption agent from the second washer;

a container for the absorption agent;

a return line from the recovery device to the container for return of absorption agent from the recovery device to the container; and means for supplying oxygen into the return line to contact absorption agent thereat such that calcium sulfite in the absorption agent is oxidized to calcium sulfate.

4. A wet flue gas desulfurization apparatus according to claim 3, wherein the means for supplying oxygen into the return line is operable to supply oxygen by an apparatus for actively blowing in air.

5. A wet flue gas desulfurization apparatus according to claim 1, wherein the container is at a lower elevation relative to the recovery device such that movement of the absorption agent along the return line from the recovery device to the container is promoted.

6. A wet flue gas desulfurization apparatus according to claim 3, wherein the means for supplying oxygen into the return line includes a pipe having a series of orifices through which oxygen can be introduced into contact with the absorption agent.

7. A wet flue gas desulfurization apparatus according to claim 3, wherein the recovery device includes a funnel and the means for supplying oxygen into the return line includes a pipe having a series of orifices through which oxygen can be introduced into contact with the absorption agent.

* * * * *

UNITED STATES PATENT AND TRADEMARK OFFICE
CERTIFICATE OF CORRECTION

PATENT NO. : 6,555,082 B1  
DATED : April 29, 2003  
INVENTOR(S) : Welp

Page 1 of 1

It is certified that error appears in the above-identified patent and that said Letters Patent is hereby corrected as shown below:

<u>Title page, Item [54] and Column 1, lines 1-3,</u>  
should read as follows: -- METHOD FOR WET FLUE GAS DESULFURIZATION AND APPARATUS FOR PERFORMING SAME --

<u>Title page,</u>  
Item [22], should read as follows:  
-- [22] PCT Filed: May 14, 1999 --

Signed and Sealed this

Nineteenth Day of August, 2003

JAMES E. ROGAN  
*Director of the United States Patent and Trademark Office*